Jan. 10, 1961     E. R. DREILING     2,967,748
BUTTER CONTAINER
Filed Jan. 17, 1958
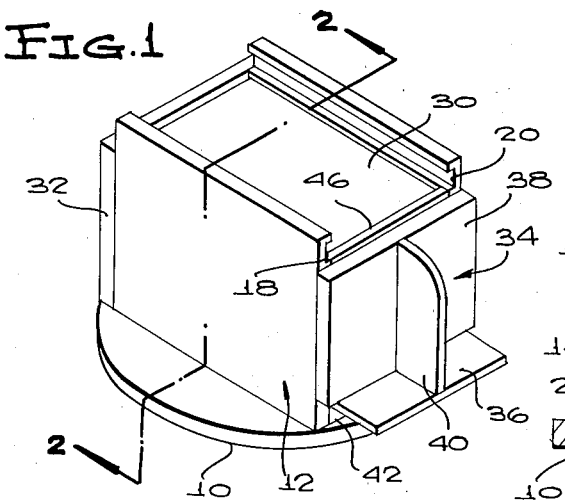
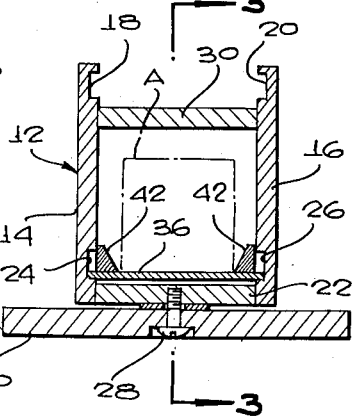
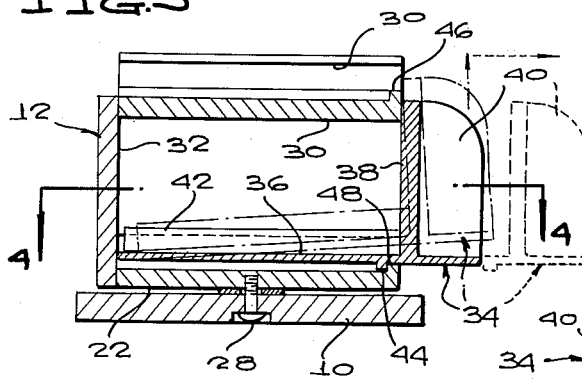
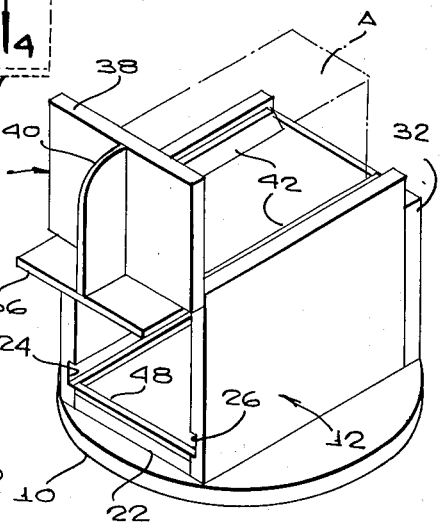
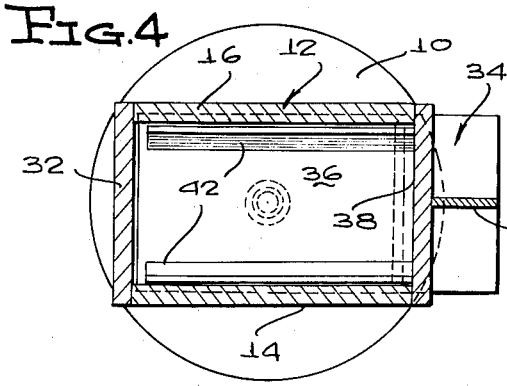
INVENTOR.
EDWARD R. DREILING
BY
McMorrow, Berman & Davidson
ATTORNEYS

United States Patent Office 2,967,748
Patented Jan. 10, 1961

2,967,748
BUTTER CONTAINER

Edward R. Dreiling, Compton, Calif.
(68 S. Maddux Drive, Reno, Nev.)

Filed Jan. 17, 1958, Ser. No. 709,488

1 Claim. (Cl. 312—318)

This invention relates to butter containers, and more particularly has reference to a container or holder for butter, margarine, or similar food products, designed to fully enclose the product when the same is not in use, while still permitting the food product to be supported in an exposed position, where access can be conveniently had thereto, whenever desired.

At this point, it will be noted that the device will be hereinafter referred to entirely as a container for butter. However, this term is merely used to facilitate understanding of the invention, and it is to be understood that the container is usable not only for holding butter, but also for holding any of various food products of generally similar characteristics and shapes, including margarine, shortening, etc.

Food products of the type described tend to become rancid when exposed unduly to the air, and in addition, may absorb odors when in a refrigerator, if exposed to various other foods. For this reason, covered butter dishes and the like have been devised. However, these have disadvantages in that they tend to be of relatively large size, and in addition, require complete removal of the lid, often in circumstances in which there is no convenient location on the table where the lid may be placed.

Another object is to provide a tray on which the butter is supported, which tray is ordinarily placed drawer-fashion in an associated casing, cooperating with the walls of the casing in completely enclosing the butter.

Another object is to so design the tray and casing that when the tray is removed for providing access to the butter, the tray can be slidably engaged upon the top of the casing, in a manner securely holding the tray and casing against relative transverse movement, to facilitate slicing of the butter in an elevated position over the table surface.

Another object is to so relate the tray to the associated housing, in the last-named position of the tray, as to hold the butter in place upon the tray, without possibility of lateral slippage from its assigned position.

Other objects will appear from the following description, the claims appended thereto, and from the annexed drawing, in which like reference characters designate like parts throughout the several views, and wherein:

Figure 1 is a perspective view of a butter container according to the present invention;

Figure 2 is a transverse sectional view;

Figure 3 is a longitudinal sectional view, the tray being shown in full lines in its closed position, in chain-dotted lines in a position assumed thereby while it is being removed, and in dash lines when fully disengaged from the housing preliminary to complete removal therefrom;

Figure 4 is a horizontal section substantially on line 4—4 of Figure 3; and

Figure 5 is a perspective view of the device with the tray engaged on the top of the container.

Referring to the drawing in detail, a flat, circular base 10 is provided, in supporting relation to a housing generally designated 12. Housing 12 includes opposite but identically formed side walls 14, 16 of rectangular formation, the inner surfaces of which, adjacent the top edges of the side walls, are formed with end-to-end, shallow, confronting guide grooves 18, 20 respectively.

Fixedly connected between the lower edge portions of the side walls is a bottom wall 22. A short distance upwardly along the inner surfaces of the side walls from the bottom wall 22, there are formed confronting guide grooves 24, 26, similar to the upper guide grooves 18, 20.

A center opening is formed in the base 10, and is counterbored at its lower end to receive the head of a screw 28, threadedly engaged in a centrally disposed, threaded recess of the bottom wall 22. A suitable washer is employed as a spacer, between base 10 and bottom wall 22, so that the housing can be freely rotated or swiveled on screw 28.

In some commercial embodiments, it may be desired to eliminate the swiveled mounting of the housing, that is, the device might be made without the base 10. Use of the base, of course, facilitates access to the tray, since it provides a "Lazy Susan" type of construction that allows the housing to be turned in a manner to permit grasping of the butter tray 34 with maximum ease and speed.

Tray 34 closes one end of the device when in its normal, closed position shown in full lines in Figure 3. Housing 12, in this connection, is closed at its top by a top wall 30, and at its other end by an end wall 32.

Tray 34 includes a flat, rectangular support plate 36, and integral with the support plate adjacent one end thereof is an upstanding, rectangular wall 38 (see Figure 5) adapted to close the open end of the container when the tray is in the full line position shown in Figure 3. Between the abutment or wall 38 and the adjacent extremity of the plate 36, the tray is integrally formed, medially between opposite sides thereof, with a flat, plate-like handle 40 fixedly connected between wall 38 and plate 36 in a manner to not only reinforce the connection between the plate and wall, but also, provide a handle that can be grasped when the tray is being inserted or removed.

The portion of the plate 36 between wall 38 and the other extremity of the tray is of substantial area, occupying, in fact, the major area of the tray. This portion is the location of the tray on which the article A carried by the tray is supported. The article A may be a quarter-pound print of butter, in a small size of the device. In a larger size, the article A may be a full-pound print. In any event, extending along and fixedly secured to opposite sides of the plate 36 are confronting, oppositely but identically formed, low walls 42, having downwardly convergent inner surfaces as shown in Figure 2. The article A is supported between the walls and is held against lateral slippage thereby. The walls 42 extend fully from the wall 38 to the plate extremity remote from handle 40.

Integrally formed on the underside of the plate, and extending across the full width of the plate, is a depending rib 44 (see Figure 3), said rib being offset longitudinally of the tray a short distance from the wall 38, in the direction of the plate extremity remote from handle 40. As will be noted, on the top surface of top wall 30, at the open end of the housing, there is provided a transverse abutment 46, vertically aligned with a corresponding, lower transverse abutment 48 integrally formed upon the top surface of bottom wall 22, at the open end of the housing. Abutments 46, 48 in height are substantially equal to the height of rib 44, and furthermore, the abutments 48 extend upwardly from the plane of the top surfaces of the bottom wall 22 and top wall 30 respectively, a distance such that the tops of the abutments 46, 48 are coplanar with the bottom surfaces of the upper grooves 18, 20 and the lower grooves 24, 26 respectively.

In use, the tray is normally positioned as shown in full lines in Figure 3. The article A is thus completely enclosed, fully protected against the air, thus permitting use of the device on picnics and camping trips, as well as in the home. When the tray is to be removed, it is first rocked upwardly as shown in Figure 3 in the chain-dotted position, pivoting upwardly upon the extremity of the tray remote from handle 40. This causes abutment 44 to clear abutment 48. The tray may now be moved horizontally to the right in Figure 3, to the dash-line position shown in this figure. The tray is then moved to the right beyond the dash-line position, to be fully removed from the container.

The tray may now be positioned on top of the container as in Figure 5, with the side edge portions of the plate 36 sliding in the grooves 18, 20, rather than in the grooves 24, 26 where they were previously slidably engaged when the tray was in its full line position of Figure 3. When the tray reaches the Figure 5 position, it is securely engaged in the guide grooves 18, 20 against transverse slippage, and in turn the walls 42 hold the article A against transverse slippage relative to the tray. Full access to the article A is thus provided, facilitating slicing of pats of butter therefrom.

Furthermore, the tray is locked, when in its upper position, against movement in a retrograde direction, by interengagement of rib 44 and upper abutment 46. To remove the tray from its upper position, the same practice is followed as illustrated in Figure 3 during the removal of the tray from the interior of the container.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claim.

What is claimed is:

A food block container comprising a horizontal rectangular casing having a bottom wall, upstanding side walls, a top wall, and a back wall, the casing having an open front, a food block supporting tray removably inserted in the open front of the casing, said tray having a bottom wall having side edges, said casing side walls having inner surfaces formed with grooves extending from front to rear thereof in which said side edges are engaged, said grooves being wider than the thickness of the side edges, said grooves having lower sides adjacent to the casing bottom wall upon which the side edges of the tray bottom wall slidably rest, an upstanding rib on and extending across the casing bottom wall at the front end of the casing, and a depending rib on and extending across the tray bottom wall to engage behind the upstanding rib in the fully inserted position of the tray, an upstanding front wall on said tray bottom wall, to abut the front end of the casing and close said open front in the fully inserted position of the tray, and handle means on the front end of the tray, said tray bottom wall having upstanding rails extending along its side edges and bearing against the inner surfaces of the casing side walls, said tray bottom wall being otherwise unencumbered, the side walls of the casing having upper portions extending above the casing top wall and having inward sides formed with second grooves extending from front to rear therealong, said second grooves being of the same width and depth as the first mentioned grooves, a stop rib upstanding on and extending across the casing top wall at the front end thereof, the tray when withdrawn from the casing being adapted to be positioned over the casing with the side edges of its bottom wall engaged in the second grooves and with its depending rib engaged behind the stop rib.

References Cited in the file of this patent

UNITED STATES PATENTS

| | | |
|---|---|---|
| 357,006 | Hoffmann | Feb. 1, 1887 |
| 542,277 | Pauly | July 8, 1895 |
| 1,992,583 | Schulz | Feb. 26, 1935 |
| 2,015,518 | Fuller | Sept. 24, 1935 |
| 2,299,418 | Thomas | Oct. 20, 1942 |
| 2,455,417 | Holan | Dec. 7, 1948 |
| 2,800,380 | Baker | July 23, 1957 |

FOREIGN PATENTS

| | | |
|---|---|---|
| 579,255 | France | July 28, 1924 |
| 130,178 | Australia | Nov. 22, 1948 |